United States Patent [19]

Suzuki et al.

[11] Patent Number: 4,948,625

[45] Date of Patent: Aug. 14, 1990

[54] METHOD FOR FORMING SURFACE LAYER BY ELECTRIC DISCHARGE PROCESS

[75] Inventors: Masahiko Suzuki, 660-33, Yagotoishizaka, Tenpaku-ku Nagoya-shi, Aichi-ken; Nagao Saito, Tokyo; Naotake Mohri, 3837-3, Shimadakuroishi Tenpaku-cho, Tenpaku-ku Nagoya-shi, Aichi-ken; Hideaki Takahashi; Tetsuo Shoji, both of Sendai, all of Japan

[73] Assignees: Masahiko Suzuki, Izumi; Mitsubishi Denki Kabushiki Kaisha, Tokyo; Naotake Mohri, Nagoya, all of Japan

[21] Appl. No.: 441,220

[22] Filed: Nov. 27, 1989

Related U.S. Application Data

[63] Continuation of Ser. No. 233,822, Aug. 15, 1988, abandoned, which is a continuation-in-part of Ser. No. 887,939, Jul. 22, 1986, abandoned.

[30] Foreign Application Priority Data

Jul. 22, 1985 [JP] Japan .............................. 60-161566

[51] Int. Cl.$^5$ .............................................. B05D 3/06
[52] U.S. Cl. ..................................... 427/37; 204/192.1; 427/327; 427/328; 427/374.1
[58] Field of Search .................... 204/192.1; 427/327, 427/328, 37, 374.1

[56] References Cited

U.S. PATENT DOCUMENTS

| 1,367,796 | 2/1921 | Cadwell | 427/37 X |
| 4,609,564 | 9/1986 | Pinkhasov | 427/37 |

FOREIGN PATENT DOCUMENTS 0064372  4/1983  Japan ..................................... 427/37

OTHER PUBLICATIONS

IUPAC-Rules 1970, Nomenclature of Inorganic Chemistry, p. 11, paragraph 1.22.

*Primary Examiner*—Bernard Pianalto
*Attorney, Agent, or Firm*—Oblon, Spivak, McClelland, Maier & Neustadt

[57] ABSTRACT

A method for forming a surface layer on a base material to be processed by electric discharge process, said method being characterized in that the electric discharge process is conducted in liquid or liquefied gas by use of a metalloid or a metal as an electrode for electric discharge process to thereby form on the surface of said base material a layer having an amorphous alloy structure or a very fine crystal structure.

11 Claims, 6 Drawing Sheets

METHOD FOR FORMING SURFACE LAYER BY ELECTRIC DISCHARGE PROCESS

This application is a continuation of application Ser. No. 233,822, filed on Aug. 10, 1988, which was a Continuation-in-Part of application Ser. No. 887,939, filed July 22, 1986, both now abandoned.

BACKGROUND OF THE INVENTION

1. Field of the Invention:

This invention relates to a process for reforming a surface of machinery and tools to be used under severe working conditions, such as a corrosive and high temperature atmosphere, as well as high stress, by an electric discharge process using a special electrode.

As has already been known, recycling vessels for nuclear fuels, vessels for chemical reactors, and so forth, are required to have high corrosion-resistant property; moreover, the blades and nozzles for gas turbine and steam turbine, and further, the jet nozzles for rocket engines, etc. are required to have high-temperature-oxidation-resistant property.

In order to improve the corrosion resistance of these structural elements, there have so far been attempted the use of a plating method and a chemical vapor deposition (CVD) method; and, for improving the heat resistant property, there has so far been adopted thermal spraying of a ceramic. All of these methods are, however, not satisfactory in their utilization in the above-mentioned fields.

As the measures for removing such disadvantages and attaining satisfactory improvement in the surface conditions of the machinery, etc., there may be contemplated reforming the surface into an amorphous structure or a very fine crystal structure; however, such method is not known. The amorphous structure which has been known and manufactured at present is limited only to very fine powder or a very thin plate, or a rod of very small size. Manufacture of such plate or rod having a fairly large size would accompany difficulty, and yet it has been considered impossible to impart to the surface of a certain base material such favorable properties, or to rigidly attach thereto such desirable amorphous structure, and hence improved properties.

Also, there has been known a method for carrying out reformation of the surface of the machinery, etc. by utilizing the electrical discharge phenomenon. For instance, in an attempt to harden the surface of a steel material by use of a tungsten electrode, electric current is caused to pass across the tungsten electrode and the surface of the steel material, while vibrating the tungsten electrode, to repeat the short-circuiting and the circuit-opening, thereby carrying out migration of the tungsten material to the steel material.

With the above-mentioned method of the surface reformation, however, no improvement in the corrosion-resistance and the high-temperature-oxidation resistance of the steel material could be attained, even though its surface becomes harder, because the surface of the steel material was not so compact.

As mentioned in the foregoing, there have so far been contemplated and attempted various methods for imparting to the surface of the metal materials high-corrosion-resistance and high-temperature-oxidation resistance being rigidly adhered to the base material, but no effective and decisive methods could be successfully realized.

The present invention has been made with a view to solving the problem as mentioned above, and aims at realizing the method of forming a surface layer having an amorphous or very fine crystal structure with high corrosion-resistant property and high heat-resistant property, by means of an electrical discharge process using a special electrode.

The method of forming the surface layer according to the present invention is to carry out an electrical discharge process on a work-piece by using a metalloid or a metal such as silicon, germanium, bismuth or zirconium as an electrode for such an electrical discharge process. The electrical discharge process is conducted in a liquid, i.e., a process liquid.

According to the method of the present invention, since the metalloid or the metallic electrode has high resistance, a multitude of very fine electrical discharges take place simultaneously on the entire surface of the electrode without causing such discharge to occur at one portion of the electrode surface, whereby the metalloid or the metallic electrode having low heat conductivity is evaporated and migrates onto the surface of a work-piece, because of its having electric charge. In this way, abrupt heating and cooling of the work-piece is effected at a high temperature and under a high pressure to thereby form the amorphous or very fine crystal structure on the surface of the work-piece.

Preferably, silicon, germanium, bismuth and zirconium is used as a positive electrode in the electric discharge process, and a potential of +300 mV or below is applied.

In order to further improve the surface roughness (nm $R_{max}$) of the metalloid or metallic electrode, such electrode has a surface are of 15 cm$^2$ or more. This contributes to the quality of the surface by maintaining the intensity of the electric current to be small and thus providing a smooth surface.

In the following, the present invention will be described with reference to a few preferred examples thereof in conjunction with the accompanying drawing.

BRIEF DESCRIPTION OF THE DRAWING

In the drawing:

FIGS. 3(a) and 3(b) are respectively electron micrographs showing the metal structure of stainless steel (SUS-304) as processed by electric discharge using the silicon electrode, wherein FIG. 3(a) is a micrograph of the metal structure by the SEM image, and FIG. 3(b) is a micrograph of the metal structure by the linear analysis using EPMA;

Figure 1:
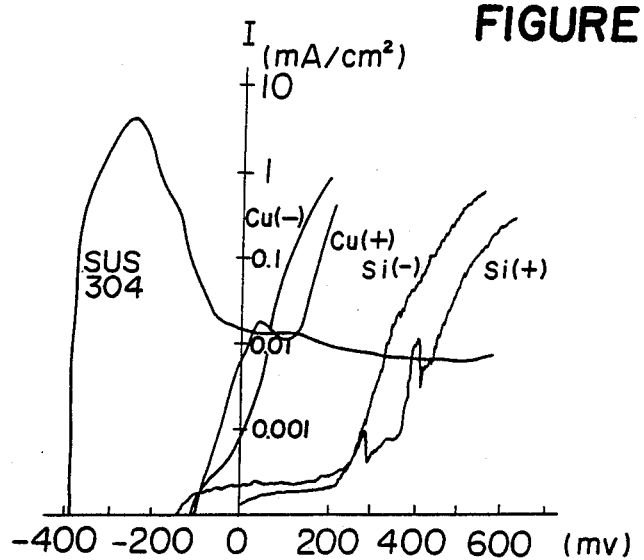
FIG. 1 is a graphical representation of anode polarization showing the test results of conducting the electric discharge process on the base materials according to Example 1 of the present invention.

For the purpose of realizing the technique of imparting high corrosion-resistance and high-temperature-oxidation resistance to the surface of the metal in a state of their being rigidly adhered to the base material either an amorphous layer is produced on the surface of the base material with a certain area, or a compact and very fine crystal structure is produced thereon with a certain area, by means of an electrical discharge process. That is to say, it was discovered that, when the base material is processed to have a compact and very fine surface over a wide area by using an electric discharge process, a part of the electrode material migrates to the surface of the workpiece to effect abrupt heating and cooling thereof at a high temperature and under a high pressure, on account of which there is produced the amorphous or compact and very fine crystal structure in the surface layer thus formed. It was also discovered that, in such case the use of a metalloid as the electrode material was desirable, which did not render the processed surface to be coarse, even if the processing area became larger or a large amount of electric powder was supplied. By metalloid, those substances such as silicon, germanium, bismuth and zirconium, etc. are intended.

When silicon, for example, is used as the electrode for the electric discharge process, no electric discharge takes place at one portion of the electrode surface, but very fine electric discharges occur on the entire surface of the electrode, even if a large electric power is supplied or the electric discharge process is conducted over a wide area, because the electrode as a whole possesses resistance. This phenomenon was adopted for the purpose of the present invention.

In the following, various experiments and the results obtained therefrom will be explained, which the present inventors conducted on the basis of the abovementioned concept.

EXAMPLE 1

Stainless steel ("SUS-304" 18Cr-8Ni-Fe) having a gauge of 13 mm was used as the base material, and copper and silicon (with impurities having been injected thereinto) were used as the electrodes.

Then, the electric discharge process was carried out under the conditions as shown in the following table and in FIG. 5.

TABLE

Conditions for Electric Discharge Process on Stainless Steel (SUS-304) and Carbon Steel (SS-45), and Sape of Electrode

| Sample No. | Work-Piece | Elect-rode | Polarity of elect-rode | Peak value $Ip$ (A) | Pulse width $\tau p$ ($\mu$sec) | Inter-val $\tau r$ ($\mu$sec) | Pro-cess liq. | Pro-cess time (Hr) |
|---|---|---|---|---|---|---|---|---|
| 1 | SUS 304 | Cu | − | 1 | 3 | 2 | oil | 6.0 |
| 2 | | Cu | + | 1 | 3 | 2 | oil | 6.1 |
| 3 | | Si | + | 1 | 3 | 2 | oil | 2.0 |
| 4 | | Si | − | 1 | 3 | 2 | oil | 2.0 |
| 5 | SS45 | Si | + | 1 | 3 | 2 | oil | 3.3 |
| 6 | | Si | − | 1 | 3 | 2 | oil | 3.3 |
| 7 | | Cu | − | 1 | 3 | 2 | oil | 6.0 |
| 8 | | Cu | + | 1 | 3 | 2 | oil | 6.0 |

From the results of the electric discharge process, the surface structure, characteristics, etc. of the work-piece as processed were determined by the below-mentioned analytical, observational, and experimental means.

(1) Anode polarization characteristic
(2) Linear analysis by the energy dispersion method
(3) Corrosion test with aqua regia
(4) Linear analysis by a scanning type electron microscope image (hereinafter abbreviated as "SEM") and an electron prove micro-analyzer (hereinafter abbreviated as "EPMA")
(5) Electron beam diffraction image
(6) Joining test by repeated large deformation (1) Anode Polarization Characteristic (FIG. 1)

Since the micro-structure of the metal material is highly sensitive to the electro-chemical properties, this test was conducted. The conditions for the measurement are as follows.

Solution: 0.5 mol of sulfuric acid ($H_2SO_4$) and 0.1 mol of salt (NaCl) in mixture Potential sweeping speed: 1 mV/sec.

Reference electrode: saturated calomel electrode

As shown in FIG. 1, the simple work-piece (SUS-304) has its self-potential of −400 mV, the work-piece processed with the copper electrode has its self-potential of −100 mV, and the work-piece processed with the silicon electrode has its self-potential of Si(+) 0 mV and Si(−) −150 mV.

It will be seen that the self-potential of the work-piece processed with copper and silicon moves toward the positive side and its natural corrosion speed is remarkably slower than that of stainless steel (SUS-304). In particular, the work-piece which has been processed with silicon as the positive electrode is richer than that processed with copper, from which it may be assumed that the work-piece thus processed has higher corrosion resistance. Its current density is also small at the potential of +300 mV or below, from which it has been found that the work-piece thus processed has considerably favorable corrosion resistance.

(2) Linear Analysis by Energy Dispersion Method (FIG. 2)

Figure 2A:
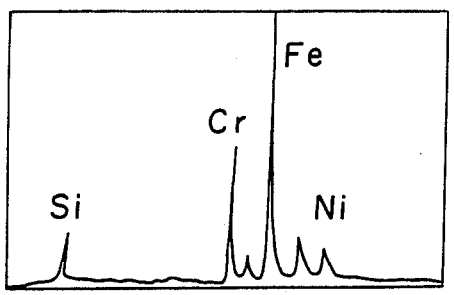
FIGS. 2(a) and 2(b) are also graphical representations showing the linear analyses by the energy dispersion method on the material as processed.
Figure 2B:
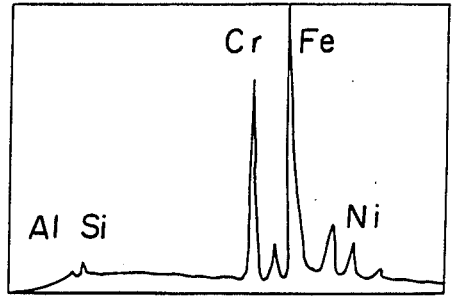

The work-piece processed with silicon as the electrode has been verified to have the presence of silicon in the vicinity of its surface (FIG. 2(a)) as compared with simple SUS-304 (FIG. 2(b)).

(3) Corrosion Test with Aqua Regia

The work-piece were immersed in the aqua regia (mixing ratio of 1 nitric acid to 3 hydrochloric acid) for two hours.

The simple work-piece of SUS-304 was completely and readily dissolved in the liquid. The work-piece processed with the copper electrode was dissolved thereinto fairly easily. The work-piece processed with the silicon electrode was found difficult to dissolve on its surface and the vicinity thereof, thus leaving a layer of 3 $\mu$m or so in the form of the thin and broad foil.

The method of separating such thin film with use of a chemical reagent can be useful for industrial, technical and scientific purposes.

Figure 3B:
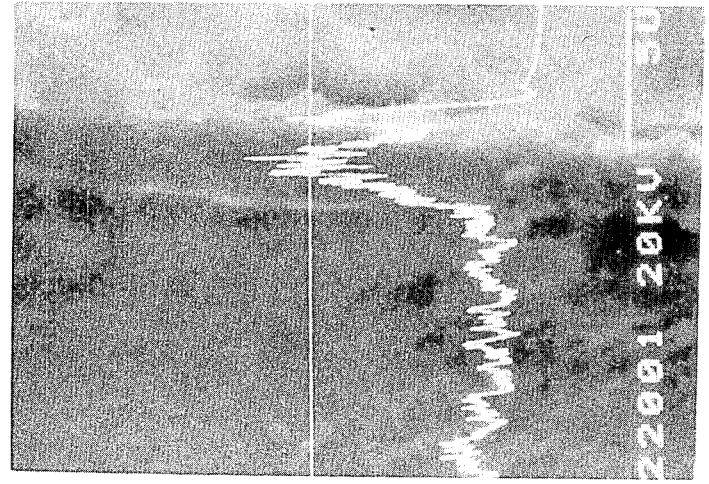
Figure 3A:

(4) Observation by SEM and Linear Analysis of EPMA (FIGS. 3(a) and 3(b))

(a) SEM image: From FIG. 3(a) thickness of the surface layer was verified to be 3 $\mu$m.

(b) Linear analysis by EPMA (FIG. 3(b)): The silicon concentration is seen to be high at the center part, and to be decreased at the boundary layer between the surface layer and the base material. From these results, it is evident that the silicon-containing surface layer has been formed.

Figure 4:
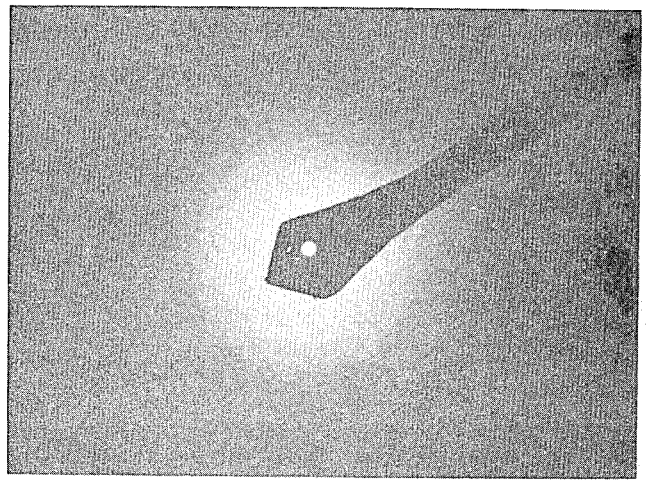
FIG. 4 is an X-ray photograph showing the crystal structure of the layer formed by the electric discharge process on the stainless steel (SUS-304) using the silicon electrode.

(5) Electron Beam Diffraction Image (FIG. 4)

FIG. 4 is an electron beam diffraction photograph of the surface layer on stainless steel (SUS-304) processed by the electric discharge using the silicon electrode. In this diffraction image, there is seen no image which identifies crystalloid, but formation of an amorphous layer.

Figure 5:
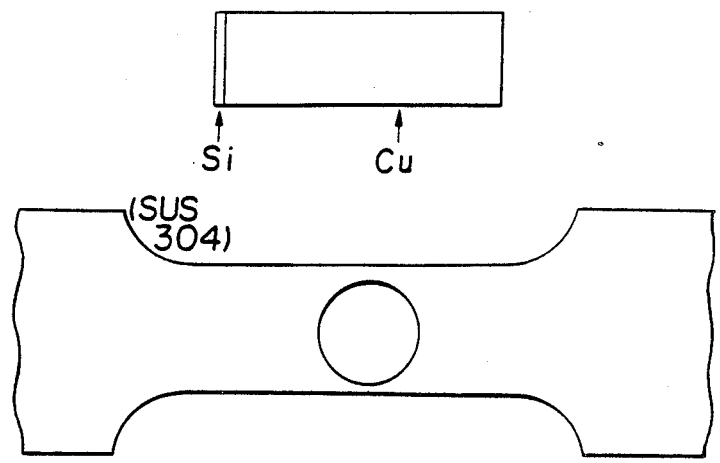
FIG. 5 is a schematic diagram showing a specimen for the joining test.
Figure 6:
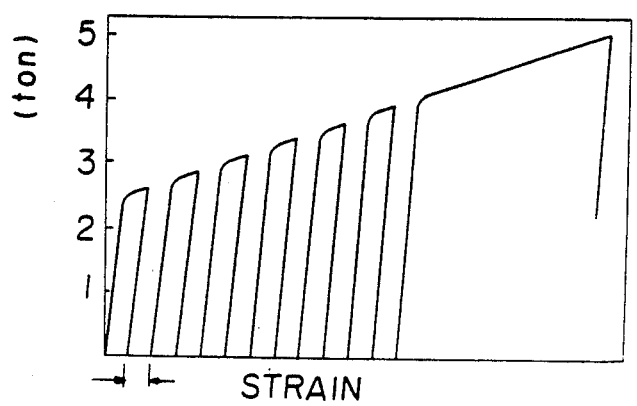
FIG. 6 is a schematic diagram for the joining test by the repeated large deformation.

(6) Joining Test by Repeated Large Deformation (FIGS. 5 and 6)

Mechanical tests were conducted on stainless steel (SUS-304) which had undergone the electric discharge process with silicon as the electrode. In this mechanical test, the test piece as shown in FIG. 5, having a rectangular cross-section of 13 mm thick and 24 mm wide and which had undergone electric discharge process, was subjected repeatedly to large deformation as shown in FIG. 6. The permanent deformation quantity of the surface layer processed by the electric discharge after the repetitive deformation was 30%, in which, however, no damage could be recognized on the processed surface by the electric discharge. This confirms that the amorphous alloy possesses ideally perfect plasticity, and that the joining property between the amorphous layer obtained by the electric discharge process and the base material to be processed has very high affinity.

EXAMPLE 2

Tests were conducted to find out as to whether there would occur any change in the corrosion resistance and other properties depending on the kind of the base material to be processed.

As the base material to be processed, use was made of "13 chromium-steel" containing therein 0.84% of nickel and which was employed as the steam turbine blade. The electrode was made of silicon. The conditions for the electric discharge process were identical with those for the stainless steel (SUS-304).

In particular, since chromium bicarbonate steel was required to have high resistance against the high temperature oxidation, for which improvement had long been desired, the test specimen was processed by means of the silicon electrode, after which it was kept for 20 hours at a temperature of 900° C., followed by air cooling. Thereafter, the SEM observation was carried out on this specimen (FIGS. 7(a) and 7(b)).

Figure 7B:
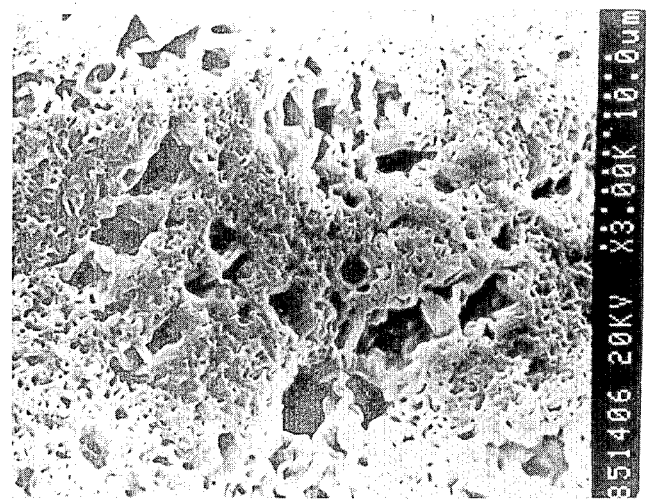
FIGS. 7(a) and 7(b) are respectively micrographs of the metal structure showing oxidation of the material as processed according to Example 2 of the present invention.
Figure 7A:
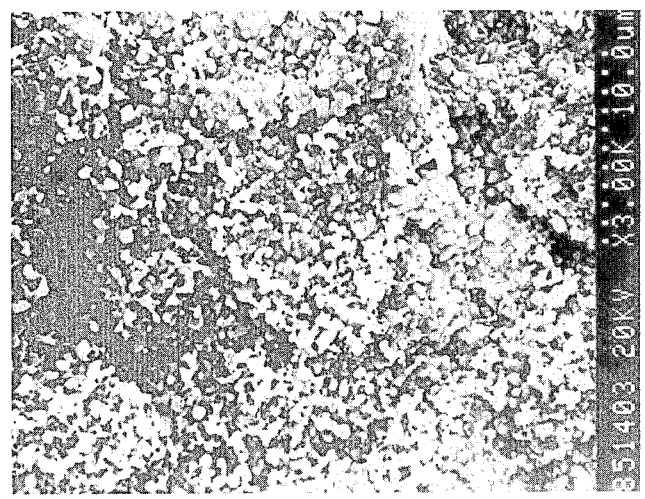

FIG. 7(a) shows the surface layer of the 13 Cr-steel processed by the electric discharge using the silicon electrode. It is seen from the micrograph that the surface of the base material is totally covered with very fine crystal granules to thereby form a layer having high resistance against the high temperature oxidation, owing to which oxidation into the interior of the Cr-steel is hindered.

Contrary to this, the simple 13 Cr-steel under the same conditions as above was vigorously oxidized, and the oxide layer of about 30 $\mu$m or so could be easily peeled off from the base material at the time of the air cooling, and scattered around, as shown in FIG. 7(b). As is apparent from the SEM photograph, large and deep craters are found to have occurred, which indicates that the oxidation extends into the interior of the base material due to the high temperature oxidation.

From these comparative tests, the significance of the surface layer obtained by the electric discharge process by use of the silicon electrode could be verified.

EXAMPLE 3

Figure 8:
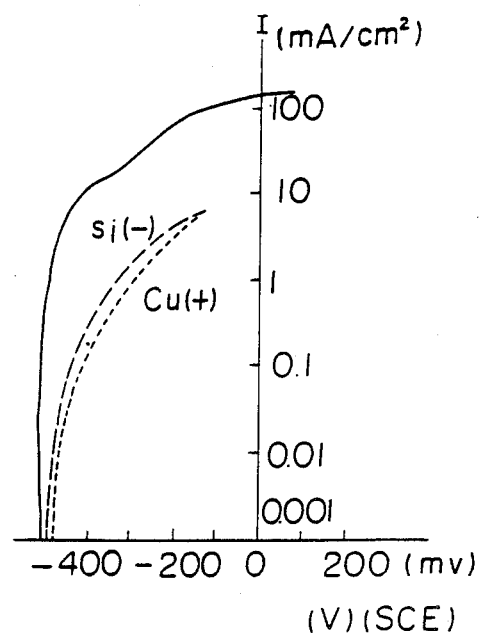
FIG. 8 is a graphical representation of the anode polarization according to Example 3 of the present invention.

By use of carbon steel (SC-45), the same electric discharge process as mentioned in the foregoing was conducted with copper and silicon as the electrode. The results as shown in FIG. 8, from which it will be seen that the self-potential of both test specimens is not much different, and the current density in the test specimens as processed by the electric discharge tends to be substantially equal. These results prove that no surface reformation was attained. It is also considered that the effect of this electric discharge process with respect to those materials containing therein large amount of carbide (cementite) is not very much.

EXAMPLE 4

With a view to finding out the effectiveness of this invention to pure metals, the electric discharge process was conducted on aluminum, which is available in general market, by use of the silicon electrode. It was found out that the corrosion resistant property was remarkably improved in comparison with aluminum which had not been subjected to the electric discharge process.

In more detail, when the test specimen of simple aluminum was immersed in 34% conc. of hydrochloric acid (HCl) for about 60 minutes, it was corroded vigorously and over its entire surface. Contrary to this, the test specimen of aluminum which had been processed by the electric discharge could not be corroded over its entire surface, but could only be affected by selective or slightly local corrosion.

For the sake of comparison, the test specimen of carbon steel, which had been subjected to the electric discharge process by use of the silicon electrode, showed that its processed surface was completely corroded with 34% conc. hydrochloric acid to disappear from the base material surface. In contradistinction, the test specimen of aluminum processed with silicon indicated a remarkable improvement in its corrosion resistant property.

Thus, it may be concluded that the present invention is also effective to those pure metals having simple metallic structure.

Figure 9:
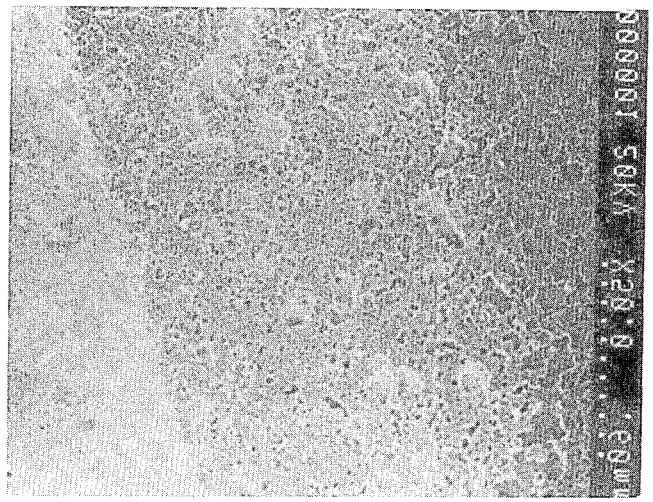
FIG. 9 is an electron-micrograph of the metal structure in the surface of the base material as processed by the electric discharge according to Example 4 of the present invention.

FIG. 9 is a micrograph showing corrosion of aluminum, which had been processed by the electric discharge using the silicon electrode, with 34% conc. hydrochloric acid. It will be seen from this micrograph that clear boundary exists between the surface layer processed by the electric discharge and the surface of the base material.

As is apparent from the foregoing test results, there may be a possibility of producing the amorphous structure or the micro-crystal structure by the electric discharge process of the base material with use of the silicon electrode. In either case, however, there exist such conditions that promote improvement in corrosion resistance and high-temperature-oxidation resistance of the surface layer as processed. Such conditions may be summarized as follows.

(1) For the electrode material, there may be contemplated the use of metalloid having certain resistance such as silicon or germanium, or a metal such as bismuth or zirconium.

(2) The material to be processed may be selected from alloy steel such as stainless steel; pure metals such as aluminum; and those alloys which do not contain carbide, etc. in much quantity.

(3) Since the conditions for the electric discharge process are directed to production of the surface layer having a micro-crystalline structure, regardless of whether the processing area is large or small, the electrode for the purpose of the electric discharge may be made of silicon itself or a silicon-containing material.

It may be noted that the present invention is also effectively applied to the treatment of metal molds for handling synthetic resin of corrosive property, diecast metal molds to be exposed to high temperature condition, and others.

It should further be noted that the electric discharge process has so far been liable to cause hair cracks in the surface of the material due to heat, which can, however, be avoided by appropriate selection of alloy (i.e., less containing coarse carbide and other ingredients) for the purpose.

In the following, mention will be made as to the conclusion obtained from various tests as described in the foregoing.

As the reason for yielding the improved corrosion resistance and high-temperature-oxidation resistance, the following may be assumed at the present stage of development. Those materials having resistance such as the silicon electrode bring about a multitude of very small discharges at the same time in the electrode surface, on account of which the very fine electric discharge process can be effected at a high speed. In addition, since the very small discharge has essentially high energy density, it causes evaporation of silicon of low heat conductivity, and, at the same time, owing to its electric charge, silicon is sputtered onto the surface of the material to be processed or onto the electrode surface. Further, the rapid cooling with the process liquid may produce amorphous structure in the surface layer as processed, provided that necessary conditions are met. For this purpose, it will be effective to cool the process liquid with liquefied gas such as liquefied nitrogen, etc., or to conduct the processing in such a liquefied gas.

When the vaporized silicon is attracted to the discharge spot at a high temperature, and then abruptly cooled, the surface of the material can be totally covered with at least a compact and thin film of silicon, or an alloy film of silicon and a metal, without any voids whatsoever in the film thus formed.

It may be said safely that, since silicon is chemically stable, it is not dissolved in aqua regia.

Also, if the cooling speed is sufficiently high, the resulting surface layer may have the amorphous structure.

In the above Examples, various tests were conducted by using silicon as an electrode. However, when bismuth, zirconium or germanium is used as an electrode, the same effects as in the above Examples will be obtained.

For the apparatus to be used for the electric discharge process in the above-described tests, use was made of an apparatus, by which a work-piece having a flat surface, a curved surface, and in a cubic form was processed by application of numerical controls in the X, Y and Z directions, while applying the servocontrols to maintain the polar distance between the electrode for the electric discharge process and the processing material.

As stated in the foregoing, since the present invention causes a multitude of very small electric discharges to occur simultaneously in the electrode surface by use of a metalloid or a metal such as silicon, bismuth, zirconium or germanium as the electrode for the electric discharge process, it has the remarkable effect of giving a method of forming an excellent surface layer having sufficient corrosion resistance and high-temperature-oxidation resistance, owing to the processing material being combined with vapor of the metalloid or the metal, and being cooled, such as by a process liquid.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. A method for forming a surface layer on a base material, said method being characterized in that an electric discharge process is conducted in a process liquid not becoming part of the surface layer by the use of silicon, germanium, bismuth or zirconium as a positive electrode for said electric discharge process wherein a multitude of very fine electrical discharges takes place simultaneously on the entire surface of the electrode, electrode material having low heat conductivity being sputtered onto the surface of the base material and the base material being abruptly heated and cooled to thereby form on the surface of said base material a layer having an amorphous alloy structure or a very fine crystal structure.

2. A method for forming a surface layer on a base material, said method being characterized in that an electric discharge process is conducted in a process liquid not becoming part of the surface layer by use of silicon, germanium, bismuth or zirconium as a positive electrode to which an electric potential of +300 mV or below is applied for said electric discharge process wherein a multitude of very fine electrical discharges takes place simultaneously on the entire surface of the electrode, electrode material having low heat conductivity being sputtered onto the surface of the base material and the base material being abruptly heated and cooled to thereby form on the surface of said base material a layer having an amorphous alloy structure or a very fine crystal structure.

3. A method for forming a surface layer on a base material, said method being characterized in that an electric discharge process is conducted in a process liquid not becoming part of the surface layer by use of silicon, germanium, bismuth or zirconium as an electrode having a surface area if 15 cm$^2$ or more for said electric discharge process wherein a multitude of very fine electrical discharges takes place simultaneously on the entire surface of the electrode, electrode material having low heat conductivity being sputtered onto the surface of the base material and the base material being abruptly heated and cooled to thereby form on the surface of said base material a layer having an amorphous alloy structure or a very fine crystal structure.

4. The method according to claims 1, 2 or 3, wherein said electrode is silicon.

5. The method according to claims 1, 2 or 3, wherein said electrode is germanium.

6. The method according to claims 1, 2 or 3, wherein said electrode is bismuth.

7. The method according to claims 1, 2 or 3, wherein said electrode is zirconium.

8. The method according to claims 1, 2 or 3, wherein said base material is a metal alloy or a single metal.

9. The method according to claims 1, 2 or 3, wherein said electrode consists of silicon, germanium, bismuth or zirconium.

10. The method according to claims 1, 2 or 3, wherein said process liquid is an oil.

11. The method according to claims 1, 2 or 3 wherein said process liquid is a liquefied gas.

* * * * *